United States Patent [19]

Schiaffino

[11] 4,068,697
[45] Jan. 17, 1978

[54] SELF-LOCKING SCREW NUT

[76] Inventor: Ubaldo Schiaffino, Via Tito Speri 18, La Spezia, Italy

[21] Appl. No.: 719,395

[22] Filed: Sept. 1, 1976

[30] Foreign Application Priority Data

Sept. 2, 1975 Italy .................................. 69182/75

[51] Int. Cl.² ........................ F16B 39/24; F16B 39/36
[52] U.S. Cl. .................................... 151/19 R; 151/38
[58] Field of Search ................. 151/19 R, 21 R, 21 C, 151/15, 38; 85/64, 32 V

[56] References Cited

U.S. PATENT DOCUMENTS

| 904,341 | 11/1908 | Lindstrom | 151/19 R X |
| 2,392,069 | 1/1946 | Sherman et al. | 151/19 R |
| 2,424,604 | 7/1947 | Dzus | 151/21 R |
| 2,518,468 | 8/1950 | Harding | 151/19 R |

FOREIGN PATENT DOCUMENTS

| 258,106 | 9/1926 | United Kingdom | 151/19 R |
| 348,076 | 5/1931 | United Kingdom | 151/19 R |

Primary Examiner—Ramon S. Britts

[57] ABSTRACT

In a self-locking screw nut comprising a central body having a central screw hole and an outside hexagonal upper portion and a downwardly tapering lower portion, and a ring nut having an inner taper matching that of the lower portion of the central body and adapted to be applied thereto, the improvement comprising a slit extending axially over the entire length of said central body and another slit extending from the top of said hexagonal portion to part of the length of said downwardly tapering lower portion to ensure uniform distribution of the forces of deformation acting on the screw nut in its position of use.

1 Claim, 6 Drawing Figures

SELF-LOCKING SCREW NUT

This invention relates to a self-locking screw nut of the type having a central body having a screw hole and a locking nut connectable to the central body.

Various types of self-locking nuts are known in which the locking effect is obtained by the use of a ring nut interposed between a central body with screw hole, or nut itself, and the surface against which the nut is tightened. In a known example of such a self-locking nut the central body has a tapered portion directed toward the surface against which the nut is tighted down, and an internally tapering ring nut adapted to engage the tapered portion of the central body. One or more slits parallel to the axis of the nut extend from the thinner end of the tapered portion of the central body and form a plurality of screw segments which are elastically urged against the corresponding screw threads of the ring nut when the latter is tightened, to avoid incidental loosening of the nut.

The practical behaviour of this and other similar types of self-locking nuts of the prior art, however, does not always correspond to theoretial calculations, mainly because neither the central body nor the ring nut can be produced to very accurate tolerances for economical reasons. So it will happen that the imperfections of the two engaging tapered surfaces of the central body and the ring nut cause seizure or sticking of the two surfaces so that the ring nut cannot be properly tightened on the central body as further rotation of the nut will meet with a high resistance before the ring nut has gained a firm grip on the screw threads of the central body.

Further, the limited length of the slits permits to use only a small portion of the screw threads of the nut for the tightening operation which often it not sufficient to avoid unscrewing of the nut.

Finally, a general drawback of the self-locking nuts of the prior art, which in part results from the disadvantages described above, consists in that also in cases in which the nut is not kept in a sufficiently locked position in the presence of discontinuous stress such as occurs, for example, in motor vehicles moving over uneven ground, the locking action tends to become inefficient when the nut is used in the presence of heavy continuous vibrations such as occur, for example, on engine cylinder blocks, etc. Under such circumstances the magnitude of these vibrations, which may be still increased by the resonance produced by the engine assembly, often becomes such as to overcome the compression obtained by the threads of the nut and thus the latter begins to loosen. Also often the irregular coupling between the central body and the ring nut produces differential resistance to the vibrations in the two opposed directions of oscillation. So the parts of the nut relative to one another and relative to the screw and other cooperating external parts do not return to their initial positions at the end of a complete excursion and in practice bouncing or gradual slipping occurs which finally results in loosening of the nut.

It is therefors an object of the present invention to provide an improved self-locking screw nut which will eliminate the defects of the self-locking nuts of the prior art and improve the locking efficiency by a better distribution of the tightening forces over all the threads of the nut and by a reduction of the influence of the irregularities of construction of the nut so as to permit to obtain a self-locking screw nut which will be more efficient particularly in the presence of vibrations.

This and other objects and advantages of the invention, which will become apparent from the following description, are achieved according to the invention by a self-locking screw nut comprising a central body with a screw hole and an esternal surface having a prismatic portion of engagement by a tightening tool, and a tapering portion, these two portions being coaxial, and an internally tapering ring nut matching the tapering surface of the central body, this self-locking screw nut being characterized in that the central body has a first longitudinal slit extending over the entire length of the central body, and a second partial longitudinal slit extending over the prismatic portion and part of the tapering portion.

Two preferred embodiments of the invention will now be described by may of example and with reference to the accompanying drawing, in which.

Figure 1:
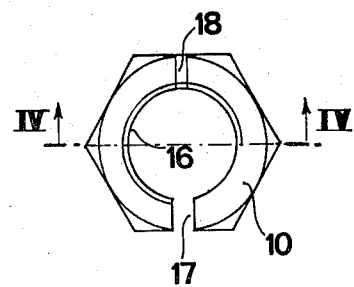
FIG. 1 is a plan view of a self-locking screw nut according to a first embodiment of the invention.
Figure 2:
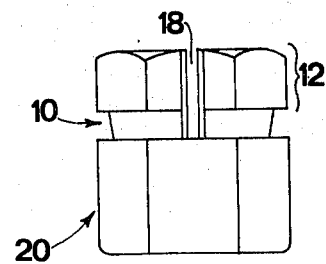
FIG. 2 is a side view of the self-locking screw nut of FIG. 1.
Figure 3:
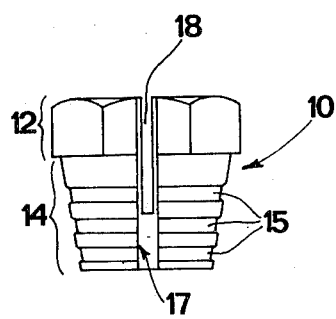
FIG. 3 is a side view of the central body of the screw nut of FIG. 1.
Figure 4:
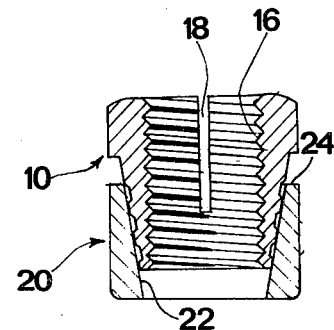
FIG. 4 is an axial section through the screw nut of FIG. 1.

Referring now to FIGS. 1 to 4, the self-locking screw nut according to the first embodiment of the invention comprises a central body 10 and a ring nut 20. The body 10 has a prismatic portion 12 of hexagonal form in cross section for engagement of a tightening tool or wrench (not shown) and a tapering substantially frustoconical coaxial portion 14 provided with a plurality of shallow circumferential grooves 15. A cylindrical axial screw hole 16 extends through the central body 10.

The annular central body 10 thus formed is split by a radial split 17 extending parallel to the axis of the body 10 over the entire axial length of the latter. A second thinner radial slit 18, likewise parallel to the axis of the body 10 and diametrally opposed to the slit 17, extends over part of the body 10, i.e. over the entire prismatic portion 10 and a part, preferably half, of the axisl length of the tapering portion 14.

The ring nut 20 is formed of a prismatic body of the same form, in cross section, as that of the prismatic portion 12 of the central body 10 and has an inner troncoconical surface 22 whose inside diameter corresponds to that of the tapering portion 14 of the central body 10. The axial length of the ring nut 20 and its medium inside diameter are so dimensioned that when the ring nut 20 is positioned on the tapering portion 14 of the central body 10, its upper edge 24 will not abut on the lower shoulder of the prismatic portion 12 even if it is strongly pushed in the axial direction. Further, the length of the ring nut 20 is greater than that of the tapering portion 14.

The two parts 10 and 20 of the self-locking screw nut are assembled by securing the ring nut 20 to the body 10 after the grooves 15 have been filled with some solid lubricant such as graphite.

When the screw nut is then fixed in its operative position by using the tightening wrench on the prismatic portion 12 of the central body 10 or on the ring nut 20, the ring nut and the central body will be moved without relative angular displacement. Therefore the frustoconical surfaces 22 of the ring nut 20 will move along the tapering portion 14 of the central body only in the axial direction, this movement being facilitated by the presence of the lubricant. Thus wear between the two surfaces and seizure or sticking which may result therefrom are avoided. The locking action of the ring nut on the central body is due to the presence of the slits 17 and 18. The slit 17 permits the central body to be compressed over its entire axial length whereas the slit 18, which only extends over the more solid portion and is therefore more rigid than the slit 17, permits a uniform distribution of the deformation and thus ensures a more uniform and more efficient locking action as different from the use of the prior art slit which was provided only in the thinner and consequently more resilient portion of the central body.

By lubricating the joint between the central body and the ring nut these two parts can slide readily to the same extent in the two axial directions so that the vibrations to which the screw nut is subjected in use, cannot produce a different resistance in the two directions of excursion. Consequently, the two parts of the screw nut will always return to their original relative positions at the end of each oscillation and thus the undesirable gradual movement of the parts, which led to loosening of the prior art screw nuts, is avoided.

The second embodiment of the invention will not be described with reference to FIGS. 5 and 6. Also in this embodiment the self-locking screw nut comprises a central body 110 and a ring nut 120. The central body 110 is similar to the central body 10 of FIGS. 1 to 4 except that it has no circumferential grooves 15. For the rest, the central body 110 is identical to the central body 10 and comprises a prismatic portion 112, a tapering portion 114 and slits 117 and 118.

Figure 5:
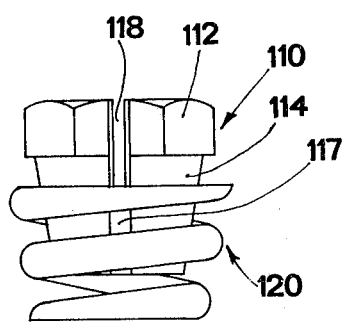
FIG. 5 is a side view of a second embodiment of the screw nut according to the invention.
Figure 6:
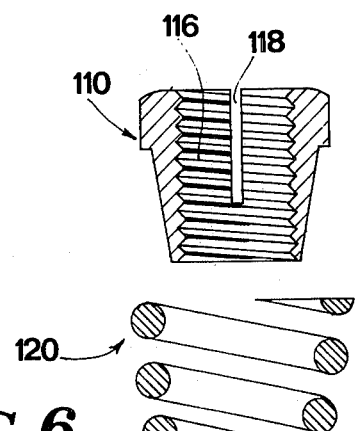
FIG. 6 is an exploded longitudinal section of the screw nut of FIG. 5.

However, the ring nut 120 of FIGS. 5 and 6 is completely different from the ring nut 20 in that it is formed of a few threads of a sturdy troncoconical helical spring having an inside diameter corresponding to that of the tapering portion 114 of the central body 110. This spring is formed of steel wire of circular cross section of considerable strength so that it is stronger than the stiffness of the central body 110. The threads of the spring forming the ring nut 120 are spaced from one another. This is important and essential to ensure good operation of the screw nut as the ring nut can thus be compressed axially on tightening the screw nut.

In the embodiment shown in FIGS. 5 and 6, the ring nut 120 not only exerts a locking action on the central body 110 in a manner similar to that of the embodiment of FIGS. 1 to 4, but also creates a spring action or damping action between the central body 110 and the surface (not shown) against which the screw nut is tightened down, this spring action being particularly efficient for dampening vibrations. Also in this case the parts are permitted to vibrate, but the parts cannot meet with different resistance in the two directions of their excursion, thus ensuring that the medium position, i.e. the final position at the end of the vibrations, will always correspond to the position occupied by the parts before the beginning of the vibrations. In this manner the screw nut cannot get loose due to minute repeated bouncing movements caused by vibrations which occur in the presence of different resistance in the two directions of movement.

Although two preferred embodiments of the invention have thus been described in detail and illustrated in the accompanying drawings, it will be understood by those skilled in the art that numerous changes and modifications may be made therein without departing from the spirit and scope of the invention.

I claim:

1. In a self-locking screw nut including a central body with a screw threaded hole and an external surface having a prismatic portion for engagement by a tightening tool, and an externally tapering portion extending from said prismatic portion, these two portions being coaxial with the tapering portion decreasing in diameter in a direction away from said prismatic portion, said central body having a first longitudinal slit extending over the entire length thereof, and a second partial longitudinal slit extending over the prismatic portion and over part of the tapering portion, the improvement comprising a frustoconical helical spring having an inside diameter corresponding to the external diameter of the tapering portion of the central body for application between said tapering portion and a surface to be clamped by said screw nut, said frustoconical helical spring being mounted on said tapering portion and extending axially beyond the free end thereof, the threads of said frustoconical helical spring being spaced from one another in the unclamped position of said screw nut and approaching one another as said screw nut is tightened to exert pressure both radially inwardly and axially of said screw nut in the clamped operative positive thereof.

* * * * *